United States Patent [19]

Lees

[11] 3,938,925
[45] Feb. 17, 1976

[54] SPIN PACK ASSEMBLY

[75] Inventor: Robert Lees, Chester, Va.

[73] Assignee: Allied Chemical Corporation, New York, N.Y.

[22] Filed: Sept. 11, 1974

[21] Appl. No.: 505,182

[52] U.S. Cl. ............. 425/198; 425/199; 425/382.2; 425/464
[51] Int. Cl.² .......................................... B29F 3/04
[58] Field of Search .......... 425/198, 382.2, 464, 72, 425/378 S, 379 S, 197, 199, 462, 463; 264/176 F, 177 F, 178 F

[56] References Cited
UNITED STATES PATENTS

| | | | |
|---|---|---|---|
| 3,044,628 | 7/1962 | Heijnis | 425/198 X |
| 3,435,108 | 3/1969 | Hendry | 425/72 X |
| 3,867,082 | 2/1975 | Lambertus | 425/382.2 X |

FOREIGN PATENTS OR APPLICATIONS

| | | | |
|---|---|---|---|
| 1,126,653 | 9/1968 | United Kingdom | 425/464 |

Primary Examiner—R. J. Shore
Assistant Examiner—Mark Rosenbaum
Attorney, Agent, or Firm—Fred L. Kelly

[57] ABSTRACT

A spin pack assembly for the extrusion of synthetic filaments. Novel features are the polymer flow channels of the breaker plate and spinneret plate which comprise a capillary with open ends, the entrance ends of the breaker plate and spinneret plate and the exit end of the breaker plate defining, respectively, enlarged inlets and outlets, the walls of which intersect with adjacent walls to form a closed, interlocking network of ridges on the top surfaces of the breaker plate and spinneret plate and on the bottom surface of the breaker plate, so as to eliminate areas of low or zero velocity flow of polymer and to reduce pressure differences in polymer in the breaker plate-spinneret plate area.

16 Claims, 9 Drawing Figures

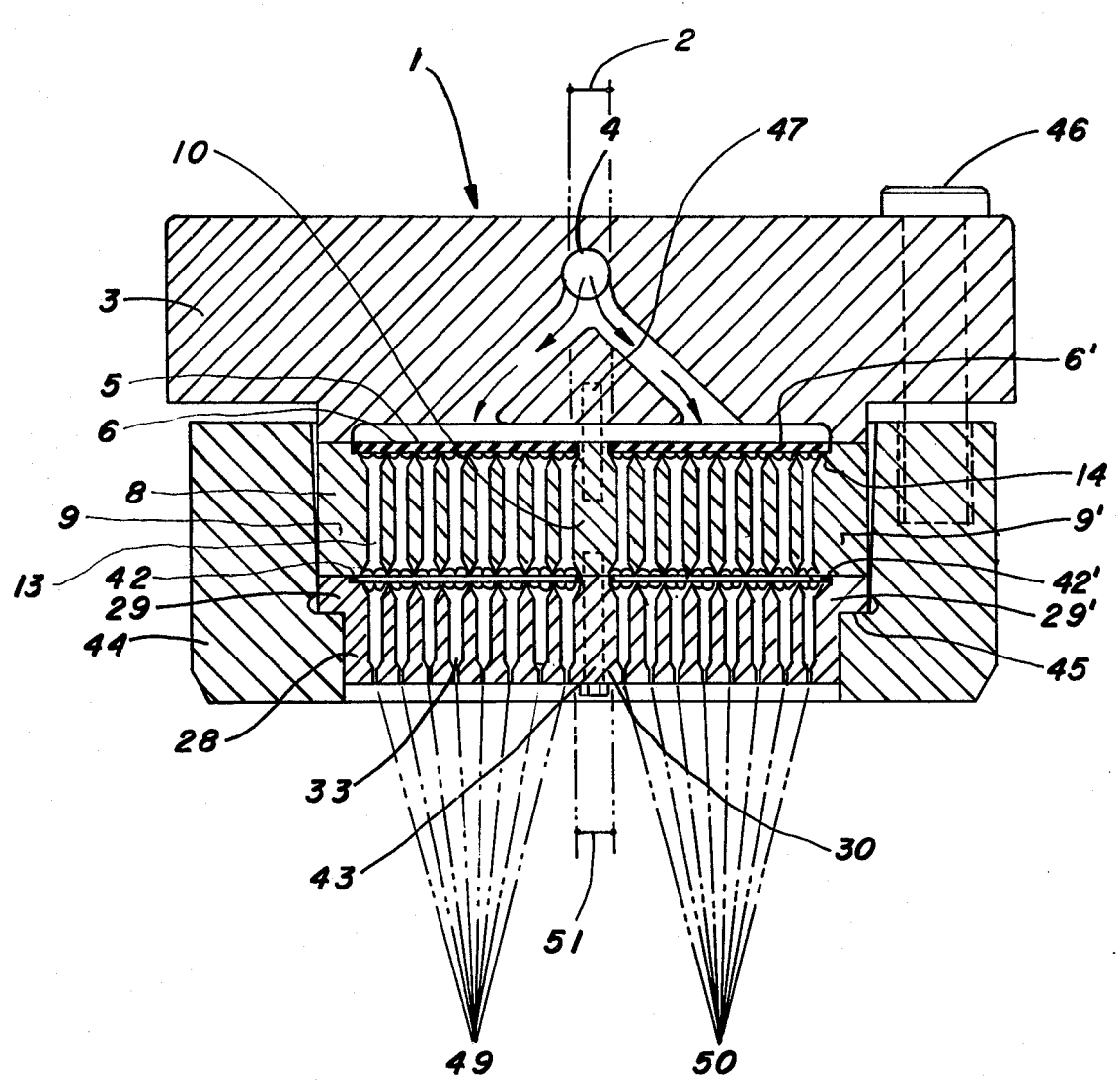
FIG. I

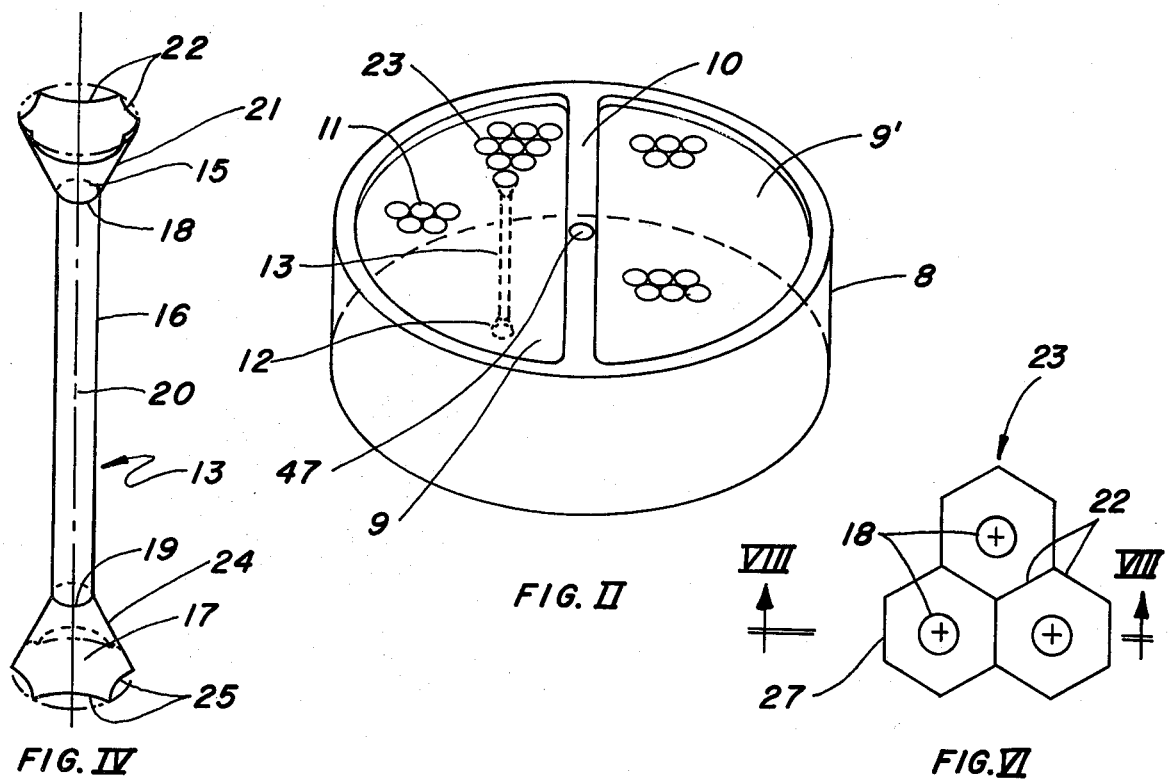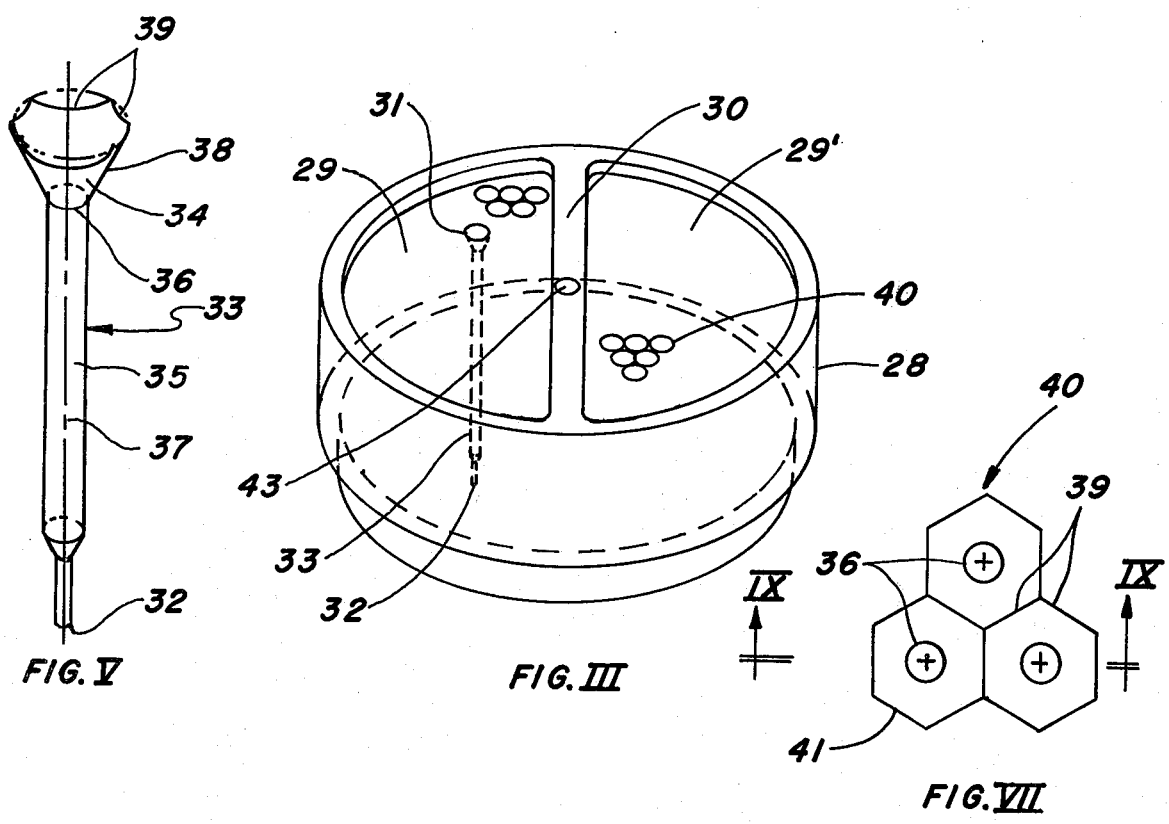

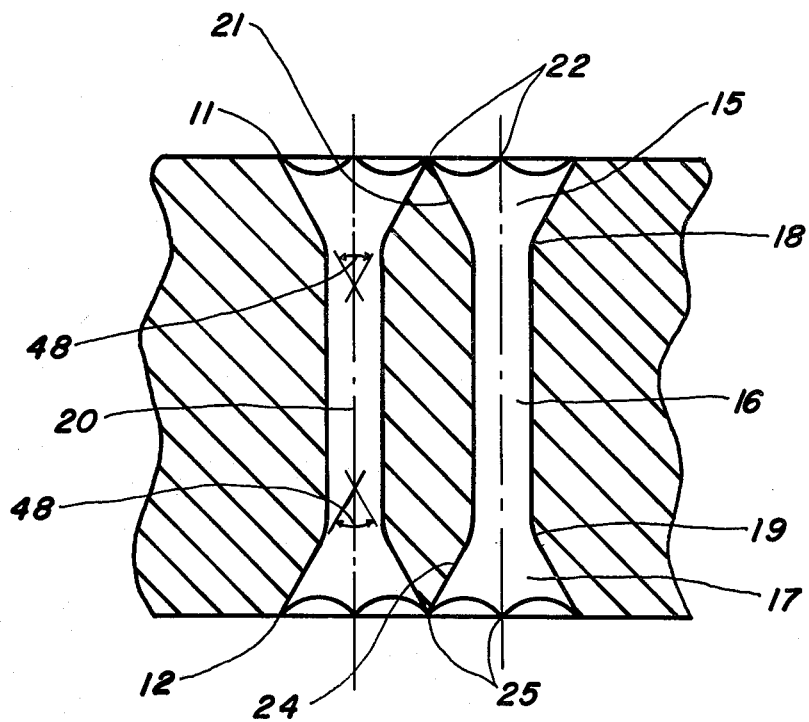
FIG. VIII
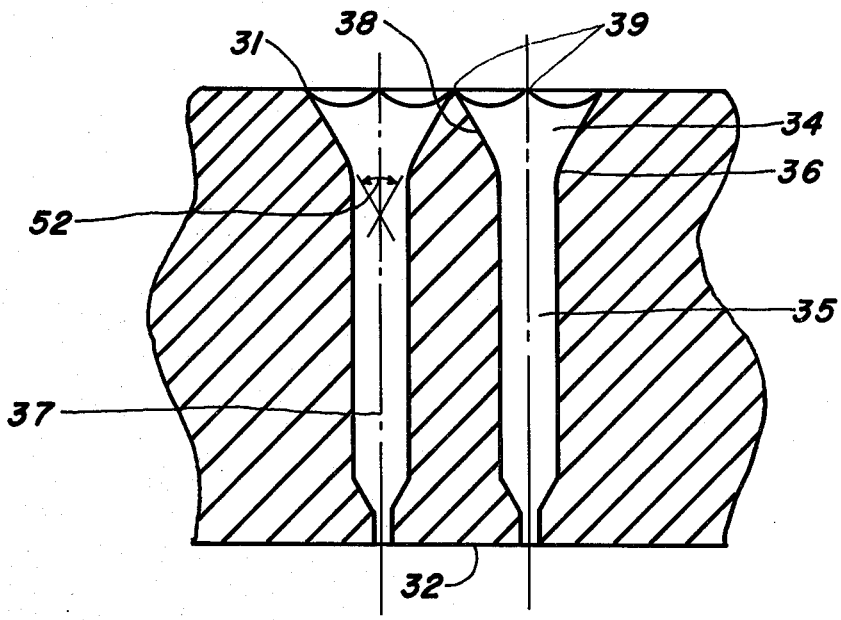
FIG. IX

SPIN PACK ASSEMBLY

BACKGROUND OF THE INVENTION

This invention relates to an apparatus for the extrusion of synthetic filaments. In particular, it relates to a spin pack assembly for the melt spinning of artificial filaments from thermoplastic materials such as nylon and polyester.

Although it will be understood from the following description that the present invention may be successfully used to produce fibers from various materials, it it nevertheless particularly applicable to the production of synthetic polymer fibers, and accordingly, stress will be placed on the use of polymer in the following description.

Conventional spin pack assemblies comprise a top cap, a filter assembly formed by a series of fine metal gauzes or fine refractory material which are held in position by metal retaining gauzes, a perforated breaker plate arranged so as to maximize mixing and minimize stagnation of the polymer and which supports the metal retaining gauzes of the filter assembly, an optional filter positioned next downstream from the breaker plate, a spinneret plate provided with shape imparting polymer flow channels and to which the melt is passed from the optional filter or directly from the breaker plate, and a spin pack body which supports the spinneret plate.

During the extrusion process within the spin pack assembly, it is important that zones of zero or low velocity polymer flow be eliminated so as to facilitate the uniform flow under pressure of the polymer. These zones occur wherever a flat surface perpendicular to the polymer flow inhibits the smooth, downward flow of the polymer, particularly on the top surfaces of the breaker plate and spinneret plate and in the breaker plate-spinneret plate area. There are only a finite number of shape imparting polymer flow channels provided in the breaker plate and spinneret plate, and the surface area between these polymer flow channels provides a plateau perpendicular to the polymer flow upon which polymer can accumulate. The polymer builds up on these plateaus until it forms small, semi-stagnant pools which become thermally degraded. These pools, or portions thereof, intermittently dislodge themselves from the surface area and enter the polymer stream, thus, either causing a break in extrusion or contributing to the formation of weak points in the filaments.

Also, the pools, or portions thereof, which do not dislodge themselves from the surface area necessitate stopping the extrusion process periodically so that they may be removed, and then restarting. Whenever a break occurs in the extrusion process, it is usually necessary to spin filaments to waste for about 15 minutes before operation returns to normal. This is a serious disadvantage economically.

In the space between the breaker plate and spinneret plate there are pressure differences which affect the quality of the extruded polymer filaments. When the polymer flow channels of the breaker plate are capillaries whose exit is such as to form a right angle with the bottom surface of the plate, the polymer stream will deviate from its normal downward flow by up to this 90° angle, thus creating pressure differences in the breaker plate-spinneret plate area. The greater the angle of deviation, the greater the pressure drop. Free polymer flow in this area would provide a more nearly equal pressure on the polymer entering the spinneret plate.

The prior art discloses conically shaped inlets to the polymer flow channels of the breaker plate and spinneret plate, as well as conically shaped outlets from the polymer flow channels of the breaker plate. These conically shaped inlets and outlets reduce the surface area upon which polymer can accumulate, and additionally, furnish a guiding means for the polymer flow. In a plan view of the breaker plate or spinneret plate these conically shaped inlets may be represented by an arrangement of circles within a bounded area. It is obvious that no matter how closely these circles are placed, relatively extensive perpendicular surface area remains upon which polymer can accumulate and inhibit a continuous polymer sweep.

Although the conically shaped outlets of the breaker plate disclosed in the prior art reduce pressure differences in the breaker plate-spinneret plate area by providing a smaller angle of deviation from the normal downward polymer flow, they still form an angle with the bottom surface of the breaker plate about which the polymer must flow; thus, pressure differences still exist. To eradicate them, a greater area of free polymer flow must be provided.

SUMMARY OF THE INVENTION

The present invention provides a spin pack assembly the essential elements of which are a conventional filter assembly, a top cap, a breaker plate, a spinneret plate, a sealing means for providing a sealed distribution space between the breaker plate and spinneret plate, and a spin pack body. The top cap has a means thereon adapted for connection to a polymer source and a flow inlet passage which discharges to the interior of a conventional filter assembly. The breaker plate has a top and a bottom surface as well as a plurality of polymer flow channels. The top surface of the breaker plate has a recess upon which the filter assembly is mounted. Each polymer flow channel comprises an enlarged inlet, a capillary aperture, and an enlarged outlet. The capillary aperture is formed within the breaker plate, its top and bottom ends being located, respectively, beneath the top surface and above the bottom surface of the breaker plate. The enlarged inlet is formed by extending a wall upwardly and outwardly from the top end of the capillary aperture until it intersects with adjacent walls in a closed, interlocking network of ridges on the top surface. Similarly, the enlarged outlet is formed by extending a wall downwardly and outwardly from the bottom end of the capillary aperture until it intersects with adjacent walls in a closed, interlocking network of ridges on the bottom surface. The spinneret plate also has a top and a bottom surface as well as a plurality of polymer flow channels. Each polymer flow channel comprises an enlarged inlet and a capillary aperture. The capillary aperture is formed within the spinneret plate with its top end being located beneath the top surface of the spinneret plate. The enlarged inlet is formed by extending a wall upwardly and outwardly from the top end of the capillary aperture until it intersects with adjacent walls in a closed, interlocking network of ridges on the top surface. Means are provided for securing the spinneret plate to the breaker plate. A sealing means for providing a sealed distribution space between the breaker plate and the spinneret plate is located therebetween. The spin pack body has a lower shoulder which supports the spinneret plate and also has a means for securing it to the top cap. The breaker plate and spinneret plate of the present invention are preferably used in conjunction with one another, but may be used independently with other spin pack assemblies which are conventional in every other sense.

In a preferred embodiment, the spin pack assembly is used for the simultaneous extrusion of multiple end, multifilament, synthetic fiber. The essential elements are a divided flow top cap, a divided flow filter assembly, a divided flow breaker plate, a divided flow spinneret plate, a divided flow sealing means for providing a sealed distribution space between the divided flow breaker plate and divided flow spinneret plate, and a spin pack body. By divided flow is meant that the spin pack assembly has a section through which polymer cannot flow; the height of this section is substantially equal to that of the spin pack assembly and the width is such as will divide the spin pack assembly to form a visible split between the multiple ends as they leave the spin pack assembly. The divided flow top cap has means thereon adapted for connection to a polymer source and a flow inlet passage which branches to discharge to either side of the section. The divided flow filter assembly is a conventional filter assembly in every aspect save that it is actually composed of two distinct, symmetrical filter packs formed by eliminating the non-polymer conducting section from the divided flow filter assembly. The divided flow filter assembly is positioned just below the divided flow top cap so that the branching flow inlet passage discharges on either side of the section to the filter packs. The divided flow breaker plate also is divided into two distinct, symmetrical segments by leaving unpierced an area of the plate equal in area to the section above described. For convenience, reference to one of the segments of the divided flow breaker plate will be understood to apply equally to the other segment. Each segment has a top and a bottom surface as well as a plurality of polymer flow channels. The top surface of the segment has a recess upon which one of the filter packs of the divided flow filter assembly is mounted. Each polymer flow channel comprises an enlarged inlet, a capillary aperture, and an enlarged outlet. The capillary aperture, which is formed within the segment, has a top end, bottom end, and a longitudinal axis; the top and bottom ends are located, respectively, beneath the top surface and above the bottom surface of the segment. The longitudinal axes of the capillary apertures are perpendicular to the surfaces of the segment and are equi-spaced within the segment. The enlarged inlet is formed by extending a wall upwardly and outwardly from the top end of the capillary aperture until it intersects with adjacent walls in a closed, interlocking network of ridges on the top surface of the segment. The walls are continuous, smooth surfaces of curvature which exhibit a converging pattern while proceeding from the top surface to the top ends of the capillary apertures. Similarly, the enlarged outlet is formed by extending a wall downwardly and outwardly until it intersects with adjacent walls in a closed, interlocking network of ridges on the bottom surface of the segment. The walls are continuous, smooth surfaces of curvature which exhibit a diverging pattern while proceeding from the bottom ends of the capillary apertures to the bottom surface. The ridges of the enlarged inlets and of the enlarged outlets define a plurality of equilateral polygonal sectional areas on their respective surfaces, more specifically, hexagons. The length of the capillary aperture is approximately 1.5 times the combined depths of the enlarged inlet and of the enlarged outlet; and the measure of the included angle formed by the walls of the enlarged inlet and enlarged outlet is from 30° to 90°, more preferably from 30° to 60°. By measure of the included angle formed by the walls is meant the imaginary intersection at the longitudinal axis of the inwardly extended straight lines which connect a ridge to its nearest end of the capillary aperture, all within each polymer flow channel. The divided flow spinneret plate is divided into two distinct, symmetrical segments by leaving unpierced an area of the plate equal in area to the section above described. Again, for convenience, reference to one of the segments of the divided flow spinneret plate will be understood to apply equally to the other segment. Each segment has a top and a bottom surface as well as a plurality of polymer flow channels. Each polymer flow channel comprises an enlarged inlet and a capillary aperture. The capillary aperture, which is formed within the segment, has a top end and a longitudinal axis; the top end is located beneath the top surface of the segment. The longitudinal axes of the capillary apertures are perpendicular to the surfaces of the segment and are equi-spaced within the segment. The enlarged inlet is formed by extending a wall upwardly and outwardly from the top end of the capillary aperture until it intersects with adjacent walls in a closed, interlocking network of ridges on the top surface of the segment. The walls are continuous, smooth surfaces of curvature which exhibit a converging pattern while proceeding in distance from the top surface to the top ends of the capillary apertures. The ridges of the enlarged inlets define a plurality of equilateral polygonal sectional areas, more specifically, hexagons. The length of the capillary aperture is approximately 3.0 times the depth of the enlarged inlet; and the measure of the included angle formed by a wall of the enlarged inlet is from 30° to 90°, more preferably from 45° to 60°. By measure of the included angle formed by the wall is meant the imaginary intersection at the longitudinal axis of the inwardly extended straight lines which connect a ridge to the top end of the capillary aperture, all within each polymer flow channel. A means is provided for securing the divided flow breaker plate to the divided flow spinneret plate. A divided flow sealing means for providing a sealed distribution space between the segments of the divided flow breaker plate and the divided flow spinneret plate is located therebetween. The spin pack body has a lower shoulder which supports the divided flow spinneret plate, and also has a means provided for securing it to the divided flow top cap.

Accordingly, by reducing the surface area upon which polymer can accumulate and by furnishing a guiding means for the polymer flow, zones of low or zero velocity polymer flow are reduced to a minimum. Pressure differences in the breaker plate-spinneret plate area are further reduced since the enlarged outlets of the breaker plate intersect with adjacent outlets in ridges on the bottom surface, thus eliminating any substantial angles about which the polymer must flow. As a direct consequence, synthetic filaments produced according to my invention are of a more uniform quality.

As used herein the word "ridge" connotes the intersection of the converging walls of the enlarged inlets of the polymer flow channels and the intersection of the diverging walls of the enlarged outlets of the polymer flow channels in such a manner as to present a relatively sharp or rounded surface to polymer flowing downwardly past said ridges through the spin pack assembly.

The invention will be more clearly understood and additional objects and advantages will become apparent upon reference to the discussion below and to the drawings which are given for illustrative purposes.

BRIEF DESCRIPTION OF THE DRAWINGS

In the accompanying drawings:

FIG. I is a vertical cross section of my spin-pack assembly;

FIG. II is a perspective view of the divided flow breaker plate;

FIG. III is a perspective view of the divided flow spinneret plate;

FIG. IV is an enlarged view of a polymer flow channel of the divided flow breaker plate of FIG. II;

FIG. V is an enlarged view of a polymer flow channel of the divided flow spinneret plate of FIG. III;

FIG. VI is a partial plan view on an enlarged scale of the polymer flow channels of FIGS. II and IV, which is identical to the bottom surface of the polymer flow channels of FIGS. II and IV;

FIG. VII is a partial plan view on an enlarged scale of the polymer flow channels of FIGS. III and V;

FIG. VIII is a cross-sectional view taken on the line VIII—VIII of FIG. VI; and

FIG. IX is a cross-sectional view taken on the line IX—IX of FIG. VII.

DESCRIPTION OF THE PREFERRED EMBODIMENTS

Referring to the drawings, wherein a preferred embodiment is illustrated in FIG. I, the spin pack assembly of the present invention is designated broadly by the numeral 1 and includes, as the major elements thereof, divided flow top cap 3, divided flow filter assembly 5, divided flow breaker plate 8, divided flow spinneret plate 28, divided flow sealing means 42, and spin pack body 44.

The spin pack assembly 1 of the preferred embodiment is designed for the simultaneous extrusion of two multifilament continuous ends 49 and 50. As a consequence there is a section 2, which runs substantially the entire height of and divides the spin pack assembly 1, through which molten polymer cannot flow. This section 2 is wide enough to form a visible stripe 51 between the two ends, 49 and 50, after they leave the divided flow spinneret plate 28.

The divided flow top cap 3 has means thereon adapted for connection to a polymer source (not shown) and a flow inlet passage 4 which branches to discharge to either side of the section 2. The divided flow filter assembly 5 is actually composed of two distinct, symmetrical filter packs 6 and 6', which are derived by eliminating the section 2 from the divided flow filter assembly 5. The divided flow filter assembly 5 is positioned just below the divided flow top cap 3 so that the branching flow inlet passage 4 discharges on either side of the section 2 to the filter packs 6 and 6'. The filter packs 6 and 6' comprise a conventional series of screens which are surrounded by a continuous metal strip for sealing purposes, as will be explained below.

Referring to FIGS. I and II, numeral 8 indicates the body of the divided flow breaker plate which is divided into two distinct, symmetrical segments 9 and 9' by means of an unpierced stripe 10 equal in area to that of the section 2 described above. For convenience, reference to one of the segments 9 of the divided flow breaker plate 8 will be understood to apply equally to the other segment 9'. Each segment 9 has a top surface 11, a bottom surface 12, and a plurality of polymer flow channels 13. The top surface 11 has a recess 14 upon which one of the filter packs 6 or 6' of the divided flow filter assembly 5 is mounted. Referring now to FIGS. IV, VI, and VIII, each polymer flow channel 13 comprises an enlarged inlet 15, a capillary aperture 16, and an enlarged outlet 17. The capillary aperture 16, which is formed within the segment 9, has a top end 18, a bottom end 19, and a longitudinal axis 20; the top 18 and bottom 19 ends are located, respectively, beneath the top surface 11 and above the bottom surface 12 of the segment 9. The longitudinal axes 20 of the capillary apertures 16 are perpendicular to the top 11 and bottom 12 surfaces of the segment 9 and are equispaced within the segment 9. The enlarged inlet 15 is formed by extending a wall 21 upwardly and outwardly from the top end 18 of the capillary aperture 16 until it intersects with adjacent walls 21 in ridges 22 to form a closed, interlocking network 23 on the top surface 11 of the segment 9. The walls 21 are continuous, smooth surfaces of curvature which exhibit a converging pattern while proceeding from the top surface 11 to the top ends 18 of the capillary apertures 16. Similarly, the enlarged outlet 17 is formed by extending a wall 24 downwardly and outwardly from the bottom end 19 of the capillary aperture 16 until it intersects with adjacent walls 24 in ridges 25 to form a closed, interlocking network on the bottom surface 12 of the segment 9. The walls 24 are continuous, smooth surfaces of curvature which exhibit a diverging pattern while proceeding from the bottom ends 19 of the capillary apertures 16 to the bottom surface 12. The ridges 22 and 25 of, respectively, the enlarged inlets 15 and the enlarged outlets 17 define a plurality of equilateral polygonal sectional areas 27 on their respective surfaces 11 and 12, more specifically hexagons. Alternately, the ridges can define a plurality of triangles, squares, etc. The depth of an enlarged inlet 15 or of an enlarged outlet 17 is dependent upon three things: the number of polymer flow channels 13 within the segment 9; the distance between the longitudinal axes 20 of the capillary apertures 16; and the measure of the included angle 48 formed by the walls, 21 or 24, of the enlarged inlet 15 or enlarged outlet 17. By measure of the included angle 48 formed by the walls, 21 or 24, is meant the imaginary intersection at the longitudinal axis 20 of the inwardly extended straight lines which connect a ridge, 22 or 25, to its nearest end, 18 or 19, of the capillary aperture 16, all within each polymer flow channel 13. Although any number of included angle 48 measurements are within the scope of my invention, I have found that particularly preferable results are achieved with an angle size of 30° to 90°, more optimally from 30° to 60°. The gross length of a polymer flow channel 13 of the divided flow breaker plate 8 ranges from 0.5 to 2.0 inches. The depth of an enlarged inlet 15 and of an enlarged outlet 17 will determine the length of the residual capillary aperture 16. Optimal results are achieved when the length of the capillary aperture 16 is approximately 1.5 times the combined depths of the enlarged inlet 15 and of the enlarged outlet 17.

Referring to FIGS. I and III, numeral 28 indicates the body of the divided flow spinneret plate which is divided into two distinct, symmetrical segments 29 and 29' by means of an unpierced stripe 30 equal in area to that of the section 2 described above. Again, for convenience, reference to one of the segments 29 of the divided flow spinneret plate 28 will be understood to apply equally to the other segment 29'. Each segment 29 has a top surface 31, a bottom surface 32, and a plurality of polymer flow channels 33. Referring now to FIGS. V, VII, and IX, each polymer flow channel 33 comprises an enlarged inlet 34 and a capillary aperture 35. The capillary aperture 35, which is formed within the segment 29, has a top end 36 and a longitudinal axis 37; the top end 36 is located beneath the top surface 31 of the segment 29. The longitudinal axes 37 of the capillary apertures 35 are perpendicular to the top 31 and bottom 32 surfaces of the segment 29 and are equi-spaced within the segment 29. The enlarged inlet 34 is formed by extending a wall 38 upwardly and outwardly from the top end 36 of the capillary aperture 35 until it intersects with adjacent walls 38 in ridges 39 to form a closed, interlocking network 40 on the top surface 31 of the segment 29. The walls 38 are continuous smooth surfaces of curvature which exhibit a converging pattern while proceeding from the top surface 31 to the top ends 36 of the capillary apertures 35. The ridges 39 of the enlarged inlets 34 define a plurality of equilateral polygonal sectional areas 41, more specifically hexagons. Alternately, the ridges can define a plurality of triangles, squares, etc. The depth of an enlarged inlet 34 is dependent upon three things: the number of polymer flow channels 33 within the segment 29; the distance between the longitudinal axes 37 of the capillary apertures 35; and the measure of the included angle 52 formed by the wall 38 of the enlarged inlet 34. By measure of the included angle 52 formed by the wall 38 is meant the imaginary intersection at the longitudinal axis 37 of the inwardly extended straight lines which connect a ridge 39 to the top end 36 of the capillary aperture 35, all within each polymer flow channel 33. Although any number of included angle 52 measurements are within the scope of my invention, I have found that particularly preferable results are achieved with an angle size of 30° to 90°, more optimally from 45° to 60°. The gross length of a polymer flow channel 33 of the divided flow spinneret plate 28 ranges from 0.5 to 1.5 inches. The depth of the enlarged inlet 34 will determine the length of the residual capillary aperture 35. Optimal results are achieved when the length of the capillary aperture 35 is approximately 3.0 times the depth of the enlarged inlet 34.

Referring again to FIG. I, a divided flow sealing means 42 is placed beneath the bottom surfaces 12 of the segments 9 and 9' of the divided flow breaker plate 8 and above the top surfaces 31 of the segments 29 and 29' of the divided flow spinneret plate 28 and provides a sealed distribution space therebetween. The divided flow sealing means 42 is actually two distinct, symmetrical sealing means 42 and 42', the shapes of which are derived by eliminating the section 2 separating them; they may be conventional crushable metal seals. Optionally, another divided flow filter, the two halves of which are surrounded by a continuous metal strip, may be positioned here for further fine filtering before entrance to the divided flow spinneret plate 28.

Referring again to FIG. I, the divided flow spinneret plate 28 is provided with a means 43 for securing it to the divided flow breaker plate 8. The spin pack body 44 has a lower shoulder 45 upon which the divided flow spinneret plate 28 is positioned. The divided flow top cap 3 has separate means, 46 and 47, for securing it to, respectively, the spin pack body 44 and the divided flow breaker plate 8. The operation of my spin pack assembly is as follows with reference to FIG. I. Molten polymer flows under high pressure into divided flow top cap 3 through flow inlet passage 4. Flow inlet passage 4 branches to either side of the section 2 to uniformly distribute the molten polymer over the filter packs 6 and 6' of the divided flow filter assembly 5. From the filter packs 6 and 6' of the divided flow filter assembly 5, the polymer flows through polymer flow channels 13 provided in the segments 9 and 9' of the divided flow breaker plate 8. After passing through the divided flow breaker plate 8, the polymer travels through the sealed distribution space provided by the divided flow sealing means 42 and 42' to the polymer flow channels 33 provided in the segments 29 and 29' of the divided flow spinneret plate 28, from which two multifilament continuous ends, 49 and 50, are spun. An optional divided flow filter may be positioned in the sealed distribution space provided by the divided flow sealing means 42 and 42' for further fine filtering.

The materials of construction of the apparatus are not critical and may be selected from any materials that are known to be satisfactory for the extrusion of molten polymer, for example, corrosion resistant steel.

While the invention has been described primarily in conjunction with the extrusion of two ends of continuous multifilament fiber, it is not intended to exclude the extrusion of a single end of continuous multifilament fiber. Various modifications and other advantages will be apparent to one skilled in the art, and it is intended that this invention be limited only as set forth in the following claims.

I claim:

1. A spin pack assembly for the simultaneous extrusion of multiple end, multifilament, synthetic fiber, comprising in combination:
   a. a section through which polymer cannot flow and running substantially the entire height of and dividing said spin pack assembly, said section being wide enough to form a visible split between said multiple ends as they leave said spin pack assembly;
   b. a divided flow top cap having means thereon adapted for connection to a polymer source and a branching flow inlet passage discharging to either side of said section;
   c. a divided flow filter assembly having two distinct, symmetrical filter packs, said filter packs being formed by eliminating said section from said divided flow filter assembly, said divided flow filter assembly being positioned just below said divided flow top cap so that said branching flow inlet passage discharges on either side of said section to said filter packs;
   d. a divided flow breaker plate having two distinct, symmetrical segments, said segments being formed by leaving unpierced an area equal to that of said section from said plate, said segments each having a top and a bottom surface and having a plurality of polymer flow channels, each of said top surfaces having a recess upon which one of said filter packs of said divided flow filter assembly is mounted, each of said polymer flow channels having a capillary aperture formed within said segment, said capillary aperture having a top end, a bottom end, and a longitudinal axis, said top and bottom ends being located, respectively, beneath said top surfaces of said segments and above said bottom surfaces of said segments, said longitudinal axes being perpendicular to said surfaces and being equi-spaced within each of said segments, each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surfaces of said segments, said walls being continuous, smooth surfaces of curvature which exhibit a converging pattern while proceeding from said top surfaces to said top ends of said capillary apertures, and each of said polymer flow channels having an enlarged outlet comprising a wall extending downwardly and outwardly from said bottom end of said capillary aperture, said wall of said enlarged outlet intersecting with adjacent walls in a closed, interlocking network of ridges on said bottom surfaces of said segments, said walls being continuous, smooth surfaces of curvature which exhibit a diverging pattern while proceeding from said bottom ends of said capillary apertures to said bottom surfaces, said ridges of said enlarged inlets and said ridges of said enlarged outlets defining a plurality of equilateral polygonal sectional areas on their respective surfaces, said equilateral polygonal sectional areas being hexagons, the length of said capillary aperture being approximately 1.5 times the combined depths of said enlarged inlet and said enlarged outlet, the measure of the included angle formed by said walls of said enlarged inlet and said enlarged outlet being from 30° to 90°;

a divided flow spinneret plate having two distinct, symmetrical segments, said segments being formed by leaving unpierced an area equal to that of said section from said plate, said segments each having a top and a bottom surface and a plurality of polymer flow channels, each of said polymer flow channels having a capillary aperture formed in said segment, said capillary aperture having a top end and a longitudinal axis, said top end being located beneath said top surface, said longitudinal axes being perpendicular to said surfaces and being equi-spaced within each of said segments, and each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surfaces of said segments, said walls being continuous, smooth surfaces of curvature which exhibit a converging pattern while proceeding from said top surfaces to said top ends of said capillary apertures, said ridges of said enlarged inlets defining a plurality of equilateral polygonal sectional areas, said equilateral polygonal sectional areas being hexagons, the length of said capillary aperture being approximately 3.0 times the depth of said enlarged inlet, the measure of the included angle formed by said wall of said enlarged inlet being approximately 30° to 90°, said plate having a means for securing it to said divided flow breaker plate;

f. a divided flow sealing means for providing a sealed distribution space between said segments of said divided flow breaker plate and said segments of said divided flow spinneret plate and located therebetween; and g. a spin pack body having a lower shoulder which supports said divided flow spinneret plate and having a means which secures said spin pack body to said divided flow top cap.

2. A divided flow spinneret plate for the simultaneous extrusion of multiple end, multifilament, synthetic fiber, comprising:

a. an unpierced center section, said section being wide enough to form a visible split between said multiple ends as they leave said plate; and b. two distinct, symmetrical segments, said segments being on each side of said unpierced center section of said plate, said segments each having a top and a bottom surface and having a plurality of polymer flow channels, each of said polymer flow channels having a capillary aperture formed in said segment, said capillary aperture having a top end and a longitudinal axis, said top end being located beneath said top surface, said longitudinal axes being perpendicular to said surfaces and being equi-spaced within each of said segments, and each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surfaces of said segments, said walls being continuous, smooth surfaces of curvature which exhibit a converging pattern while proceeding from said top surfaces to said top ends of said capillary apertures, said ridges of said enlarged inlets defining a plurality of equilateral polygonal sectional areas, said equilateral polygonal sectional areas being hexagons, the length of said capillary aperture being approximately 3.0 times the depth of said enlarged inlet, the measure of the included angle formed by said wall of said enlarged inlet being approximately 30° to 90°.

3. A divided flow breaker plate for the simultaneous extrusion of multiple end, multifilament, synthetic fiber, comprising:

a. an unpierced center section, said section being wide enough to form a visible split between said filaments as they leave said plate; and b. two distinct, symmetrical segments, said segments being on each side of said unpierced center section of said plate, said segments each having a top and a bottom surface and having a plurality of polymer flow channels, each of said polymer flow channels having a capillary aperture formed in said segment, said capillary aperture having a top end, a bottom end, and a longitudinal axis, said top and bottom ends being located, respectively, beneath said top surfaces of said segments and above said bottom surfaces of said segments, said longitudinal axes being perpendicular to said surfaces and being equi-spaced within each of said segments, each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surfaces of said segments, said walls being continuous, smooth surfaces of curvature which exhibit a converging pattern while proceeding from said top surfaces to said top ends of said capillary apertures, and each of said polymer flow channels having an enlarged outlet comprising a wall extending downwardly and outwardly from said bottom end of said capillary aperture, said wall of said enlarged outlet intersecting with adjacent walls in a closed, interlocking network of ridges on said bottom surfaces of said segments, said walls being continuous, smooth surfaces of curvature which exhibit a diverging pattern while proceeding from said bottom ends of said capillary apertures to said bottom surfaces, said ridges of said enlarged inlets and of said enlarged outlets defining a plurality of equilateral polygonal sectional areas, said equilateral polygonal sectional areas being hexagons, the length of said capillary aperture being approximately 1.5 times the combined depths of said enlarged inlet and said enlarged outlet, the measure of the included angle formed by said walls of said enlarged inlet and said enlarged outlet being from 30° to 90°.

4. A spin pack assembly for the extrusion of synthetic filaments, comprising in combination:
 a. a conventional filter assembly;
 b. a top cap having means thereon adapted for connection to a polymer source and having a flow inlet passage discharging to the interior of said filter assembly which is positioned next downstream;
 c. a breaker plate having a top and a bottom surface and having a plurality of polymer flow channels, said top surface having a recess upon which said filter assembly is mounted, each of said polymer flow channels having a capillary aperture formed in said plate, said capillary aperture having a top and a bottom end, said top and bottom ends being located, respectively, beneath said top surface and above said bottom surface, each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surface, and each of said polymer flow channels having an enlarged outlet comprising a wall extending downwardly and outwardly from said bottom end of said capillary aperture, said wall of said enlarged outlet intersecting with adjacent walls in a closed, interlocking network of ridges on said bottom surface;
 d. a spinneret plate having a top and a bottom surface and having a plurality of polymer flow channels, each of said polymer flow channels having a capillary aperture formed in said plate, said capillary aperture having a top end, said top end being located beneath said top surface, and each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surface, said spinneret plate being provided with a means for securing it to said breaker plate;
 e. a sealing means for providing a sealed distribution space between said breaker plate and said spinneret plate and located therebetween; and
 f. a spin pack body having a lower shoulder which supports said spinneret plate and having a means for securing said spin pack body to said top cap;
 said spin pack assembly being further characterized in that the longitudinal axes of said capillary apertures of said polymer flow channels are perpendicular to said surfaces; said walls of said enlarged inlets and said walls of said enlarged outlets are continuous, smooth surfaces of curvature which exhibit, respectively, a converging pattern while proceeding from said top surfaces to said top ends of said capillary apertures and a diverging pattern while proceeding from said bottom ends of said capillary apertures to said bottom surfaces; and said ridges of said enlarged inlets and of said enlarged outlets define a plurality of equilateral polygonal sectional areas selected from the group consisting of triangles, squares, and hexagons.

5. The spin pack assembly as defined in claim 4 wherein said ridges of said enlarged inlets and of said enlarged outlets define a plurality of equilateral polygonal sectional areas which are hexagons.

6. The spin pack assembly as defined in claim 5 wherein the length of said capillary aperture of said breaker plate is approximately 1.5 times the combined depths of said enlarged inlet and said enlarged outlet, and the measure of the included angle formed by said walls of said enlarged inlet and said enlarged outlet is from 30° to 90°.

7. The spin pack assembly as defined in claim 6 wherein the length of said capillary aperture of said spinneret plate is approximately 3.0 times the depth of said enlarged inlet, and the measure of the included angle formed by said wall of said enlarged inlet is from 30° to 90°.

8. The spin pack assembly as defined in claim 7 wherein each of said plates is divided into two distinct, symmetrical segments by leaving unpierced a section wide enough to form a visible split between said filaments as they leave said spinneret plate.

9. A spinneret plate for the extrusion of synthetic filaments, comprising:
 a. a top and a bottom surface; and
 b. a plurality of polymer flow channels, each of said polymer flow channels having a capillary aperture formed in said plate, said capillary aperture having a top end, said top end being located beneath said top surface, and each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surface;
 said spinneret plate being further characterized in that the longitudinal axes of said capillary apertures of said polymer flow channels are perpendicular to said surfaces; said walls of said enlarged inlets are continuous, smooth surfaces of curvature which exhibit a converging pattern while proceeding from said top surface to said top ends of said capillary apertures; and said ridges of said enlarged inlets define a plurality of equilateral polygonal sectional areas selected from the group consisting of triangles, squares and hexagons.

10. The spinneret plate as defined in claim 9 wherein said ridges of said enlarged inlets define a plurality of equilateral polygonal sectional areas which are hexagons.

11. The spinneret plate as defined in claim 10 wherein the length of said capillary aperture is approximately 3.0 times the depth of said enlarged inlet, and the measure of the included angle formed by said wall of said enlarged inlet is approximately 30° to 90°.

12. The spinneret plate as defined in claim 11 wherein said plate is divided into two distinct, symmetrical segments by leaving unpierced a section wide enough to form a visible split between said filaments as they leave said plate.

13. A breaker plate for the extrusion of synthetic filaments comprising:
 a. a top and a bottom surface; and
 b. a plurality of polymer flow channels, each of said polymer flow channels having a capillary aperture formed in said plate, said capillary aperture having a top and a bottom end, said top and bottom ends being located, respectively, beneath said top surface and above said bottom surface, each of said polymer flow channels having an enlarged inlet comprising a wall extending upwardly and outwardly from said top end of said capillary aperture, said wall of said enlarged inlet intersecting with adjacent walls in a closed, interlocking network of ridges on said top surface, and each of said polymer flow channels having an enlarged outlet comprising a wall extending downwardly and outwardly from said bottom end of said capillary aperture, said wall of said enlarged outlet intersecting with adjacent walls in a closed, interlocking network of ridges on said bottom surface;

said breaker plate being further characterized in that the longitudinal axes of said capillary apertures of said polymer flow channels are perpendicular to said surfaces; said walls of said enlarged inlets and said walls of said enlarged outlets are continuous, smooth surfaces of curvature which exhibit, respectively, a converging pattern while proceeding from said top surface to said top ends of said capillary apertures and a diverging pattern while proceeding from said bottom ends of said capillary apertures to said bottom surface; and said ridges of said enlarged inlets and of said enlarged outlets define a plurality of equilateral polygonal sectional areas selected from the group consisting of triangles, squares and hexagons.

14. Apparatus as defined in claim 13 wherein said ridges of said enlarged inlets and of said enlarged outlets define a plurality of equilateral polygonal sectional areas which are hexagons.

15. Apparatus as defined in claim 14 wherein the length of said capillary aperture is approximately 1.5 times the combined depths of said enlarged inlet and said enlarged outlet, and the measure of the included angle formed by said walls of said enlarged inlet and said enlarged outlet is from 30° to 90°.

16. Apparatus as defined in claim 15 wherein said plate is divided into two distinct, symmetrical segments by leaving unpierced a section wide enough to form a visible split between said filaments as they leave said plate.

* * * * *